United States Patent [19]

Denman et al.

[11] Patent Number: 4,666,130

[45] Date of Patent: May 19, 1987

[54] EXPANDED CELL CRASH CUSHION

[75] Inventors: Owen S. Denman, Roseville, Calif.; George Ebersole, Palos Heights, Ill.

[73] Assignee: Energy Absorption Systems, Inc., Chicago, Ill.

[21] Appl. No.: 589,706

[22] Filed: Mar. 15, 1984

[51] Int. Cl.[4] .............................................. A01K 3/00
[52] U.S. Cl. ...................................... 256/13.1; 256/19
[58] Field of Search ................. 493/966; 256/13.1, 19; 428/116, 73

[56] References Cited

U.S. PATENT DOCUMENTS

| 1,366,147 | 1/1921 | Worthington | 428/116 |
|---|---|---|---|
| 2,088,087 | 7/1937 | Hudson. | |
| 2,720,948 | 10/1955 | Pajak | 428/116 X |
| 3,033,734 | 5/1962 | Price | 428/116 X |
| 3,181,849 | 5/1965 | Mitchell. | |
| 3,225,509 | 10/1966 | May. | |
| 3,285,401 | 11/1966 | May. | |
| 3,447,163 | 2/1969 | Bothwell et al.. | |
| 3,466,733 | 4/1969 | Pajak et al. | 493/968 X |
| 3,587,787 | 6/1971 | Rich et al.. | |
| 3,744,835 | 7/1973 | Carbone et al. | 428/116 X |
| 3,837,990 | 6/1970 | McConnell et al.. | |
| 3,982,057 | 6/1974 | Briggs et al.. | |
| 4,007,917 | 9/1975 | Brubaker. | |
| 4,101,115 | 2/1977 | Meinzer. | |
| 4,183,505 | 1/1980 | Maestri | 256/13.1 |
| 4,321,989 | 1/1980 | Meinzer. | |
| 4,352,484 | 9/1980 | Gertz et al.. | |
| 4,422,183 | 12/1983 | Landi et al.. | |

FOREIGN PATENT DOCUMENTS

| 2028295 | 6/1970 | Fed. Rep. of Germany. |
| 1941600 | 2/1971 | Fed. Rep. of Germany. |
| 2334121 | 2/1975 | Fed. Rep. of Germany. |
| 2337834 | 1/1976 | France. |
| 2364788 | 9/1976 | France. |
| 1482634 | 8/1977 | United Kingdom. |
| 2083162 | 3/1982 | United Kingdom. |

Primary Examiner—Andrew V. Kundrat
Attorney, Agent, or Firm—Willian Brinks Olds Hofer Gilson & Lione Ltd.

[57] ABSTRACT

An energy absorbing apparatus is provided to dissipate the energy of an impacting vehicle. An energy absorbing sheet having a plurality of expanded cells is wrapped at least partially around a rounded hazard, or an adaptor attached to a non-rounded hazard. When secured to a rounded hazard, or the adaptor, each cell defines a longitudinal space having a cross-sectional diameter that is smaller nearest the hazard or adaptor and larger away from the hazard or adaptor. A plurality of sheets may be used in a stacked relationship to provide a shear plane.

32 Claims, 11 Drawing Figures

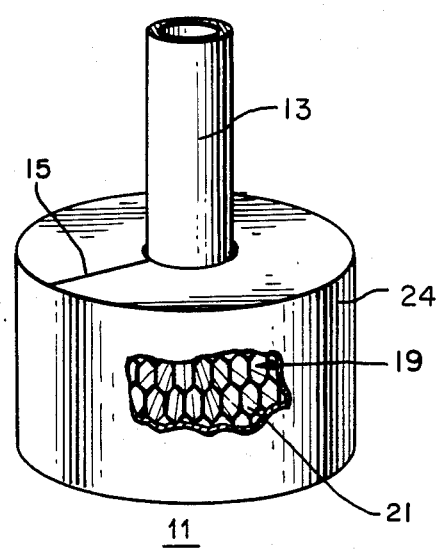
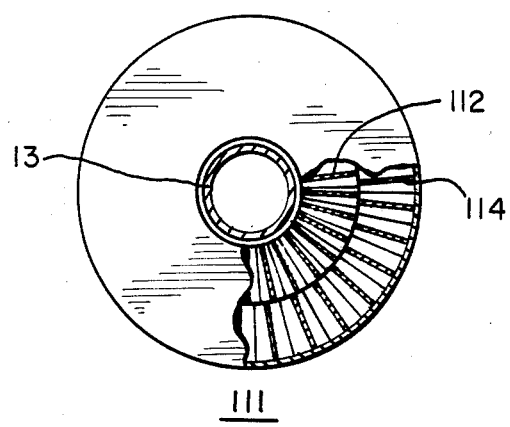
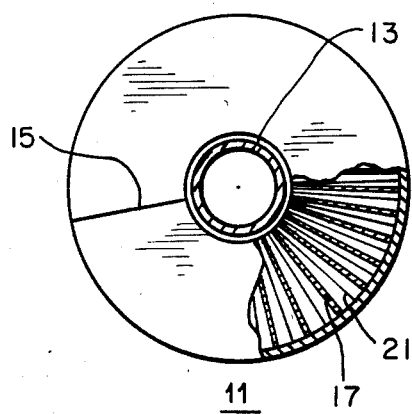
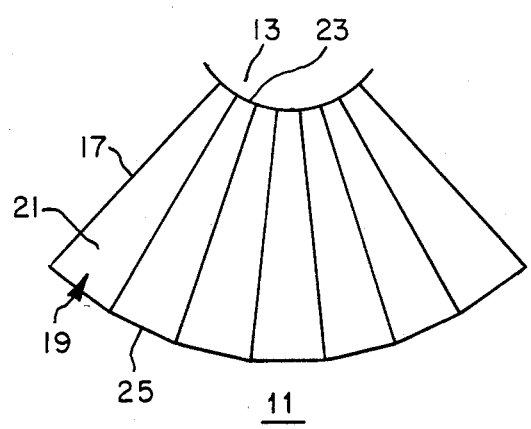
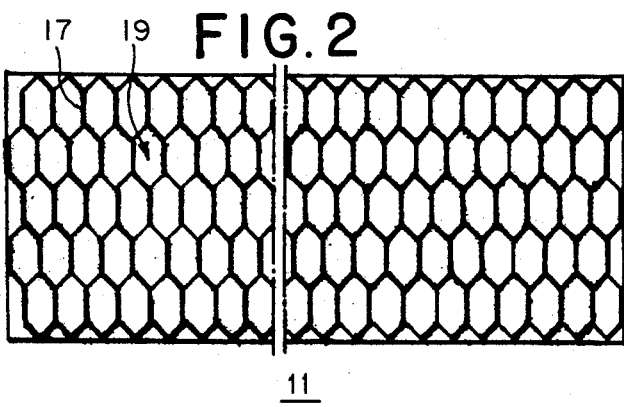
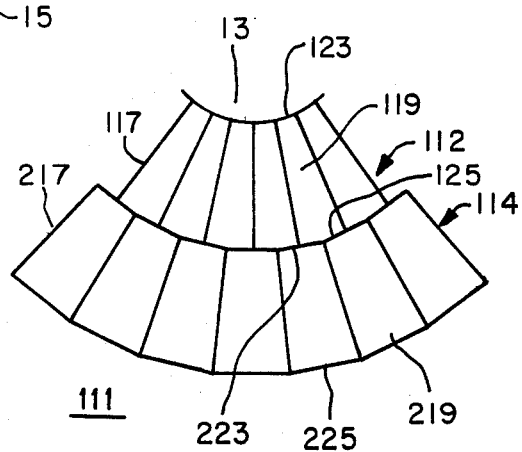

EXPANDED CELL CRASH CUSHION

BACKGROUND OF THE INVENTION

The invention relates generally to apparatus and materials for absorbing and dissipating the energy of impacting vehicles and the like. More specifically, the invention relates to an energy absorbing structure for absorbing and dissipating the energy of a vehicle impacting a utility pole, luminaire support or other hazard common along residential and low speed thoroughfares that are difficult to treat with existing appurtenances.

It is known that rigid guardrails and similar protective devices alongside vehicular traffic routes, such as high speed highways, may be used for the purpose of preventing vehicles from colliding with fixed structures such as, for example, cement abutments and columns. While these devices are commonly used on highways and the like, it is not economical and typically not possible to utilize such devices in residential areas or along low speed thoroughfares to prevent vehicles from impacting utility poles, luminaire supports, and other narrow hazards.

It is also known that the impact energy of a moving vehicle may be dissipated when the vehicle hits and crushes a deformable structure or material. Thus, it is known in the art that light weight cement, plastic foam and various fibrous materials may be used to absorbed the energy of an impacting vehicle.

Various other structures have also been utilized to absorb the energy of an impacting vehicle by compression. Thus, energy absorbing buffer elements which compress on impact have been developed. Typical of these devices are barrels which are filled with compressible materials. Usually, a plurality of these barrels are oriented in an ordered array to prevent vehicles from impacting fixed objects. Because of the cost and size of these devices they are usually not conducive to use around utility poles, luminaire supports and other narrow hazards that are difficult to treat. Moreover, these devices are usually not aesthetically pleasing and therefore even when they are cost justifiable, there is a tendency to shy away from using such devices in residential areas.

Thus, there is a need for an easily installed, low cost crash cushion that may be easily installed around, or secured to, a utility pole, luminaire support, or other hazard common along residential or low speed thoroughfares, so that the impact energy of a vehicle colliding with the hazard will at least be partially absorbed and dissipated.

SUMMARY OF THE INVENTION

The energy absorbing apparatus of this invention includes an energy absorbing sheet having a plurality of expanded cells. The energy absorbing sheet is designed to be wrapped at least partially around a hazard. When the energy absorbing sheet is secured to the hazard each cell defines a longitudinal space having a cross-sectional diameter that is smaller nearest the hazard and larger away from the hazard. The energy absorbing apparatus functions to absorb and dissipate at least some of the energy of an impacting vehicle.

The energy absorbing apparatus may include an adaptor which allows the energy absorbing sheet to be secured to a non-rounded hazard.

In a preferred embodiment, the expanded cells are filled with a filler material and the apparatus may include a cover.

In a further preferred embodiment, the energy absorbing apparatus includes a plurality of energy absorbing sheets designed to be used in a stacked relationship to provide a shear plane.

Accordingly, an advantage of the present invention is to provide a low cost crash cushion that can be easily installed around utility poles, luminaire supports, and other hazards common along residential and low speed thoroughfares that are difficult to treat with existing appurtenances.

A further advantage of the present invention is to provide an energy absorbing apparatus which is easily secured around a hazard and absorbs and dissipates at least some of the energy of an impacting vehicle.

Moreover, an advantage of the present invention is to provide an adaptor which allows the energy absorbing sheet to be secured to a non-rounded hazard.

Another advantage of the present invention is to provide an energy absorbing sheet wherein the crushing force may be varied by increasing or decreasing the number of cells per square inch of area being crushed.

An additional advantage of the present invention is to provide an energy absorbing apparatus comprising energy absorbing sheets which include cells which are filled with a deformable foam material.

A further advantage of the present invention is to provide an energy absorbing apparatus wherein the number of intersecting walls which are sheared may be varied by varying the diameters of the cells of the energy absorbing sheets.

An additional advantage of the present invention is to provide an energy absorbing apparatus comprising energy absorbing sheets which are stackable thereby providing a variable shear plane force which provides a better response.

Additional features and advantages are described in, and will be apparent from, the detailed description of the presently preferred embodiments and from the drawings.

BRIEF DESCRIPTION OF THE DRAWINGS

FIG. 1 illustrates a side elevation view of a preferred embodiment of the expanded cell crash cushion wrapped around a post, with parts broken away.

FIG. 2 illustrates a side elevation view of a preferred embodiment of the expanded cell crash cushion.

FIG. 3 illustrates a plan view of a portion of the expanded cell crash cushion of FIG. 1.

FIG. 4 illustrates a top view of the expanded cell crash cushion of FIG. 1, with parts broken away.

FIG. 5 illustrates a top view of a further preferred embodiment of the expanded cell crash cushion wrapped around a post, with parts broken away.

FIG. 6 illustrates a plan view of a portion of the expanded cell crash cushion of FIG. 5.

DETAILED DESCRIPTION OF THE PRESENTLY PREFERRED EMBODIMENTS

Figure 7:
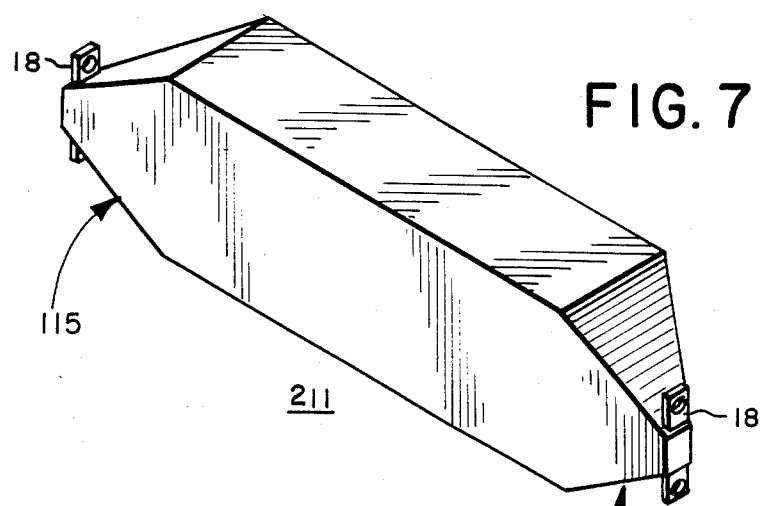
FIG. 7 illustrates a side elevation view of a further preferred embodiment of the expanded cell crash cushion.

FIG. 1 illustrates a perspective view of the expanded cell crash cushion 11 of the present invention. As illustrated in FIG. 1, the expanded cell crash cushion 11 is designed to be wrapped at least partially around a post, luminaire support, cement abutment or other hazard (hereinafter "hazard 13"). The expanded cell crash cushion 11 functions to absorb and dissipate at least some of the impact energy of a vehicle impacting the hazard 13, while at the same time protecting the hazard.

As illustrated in FIG. 2, in a preferred embodiment, the expanded cell crash cushion 11 comprises a substantially rectangular sheet which includes end members 15 and a plurality of intersecting wall members 17. The intersecting wall members 17 define cell areas 19. The cell areas 19 thereby define longitudinal spaces 21.

The cell areas 19 may be of any geometric cross-sectional shape, e.g., circular, square, rectangular, etc. The currently preferred geometric cross-sectional shape of the cell areas 19 is hexagonal. As illustrated in FIG. 1, cell areas 19 with a hexagonal cross-sectional shape thereby define longitudinal spaces 21 which have a honeycomb shape.

The end members 15 are designed to be wrapped at least partially around the hazard 13, and secured either to the hazard 13, an adaptor 14, or each other. The expanded cell crash cushion 11 is designed to either sit on the ground or pavement, or on a step (not shown) attached to the hazard 13.

As illustrated in FIG. 3, when the expanded cell crash cushion 11 is secured around the hazard 13, the cross-sectional dimension 23 of the cell area 19 nearest the hazard 13 is smaller than the cross-sectional dimension 25 of the cell area 19 farthest away from the hazard 13. This design provides an apparatus with an increased crushing force designed to absorb and dissipate at least some of the impact energy of a vehicle colliding with the hazard 13.

In operation, the energy of an impacting vehicle causes the expanded cell crash cushion 11, and thereby the cell areas 19, to be compressed. Due to the design of the expanded cell crash cushion 11, and specifically the longitudinal space 21, the impacting vehicle encounters greater resistance the closer the vehicle gets to the hazard 13. This is due to the fact that the smaller the cell diameter the greater the force needed to crush the expanded cell crash cushion 11. By varying the number of cell areas 19 per unit of area, the crushing force of the expanded cell crash cushion 11 can either be increased or decreased accordingly. This is a desirable characteristic for a crash cushion that is not rate sensitive and is confined to a relatively small space.

Of course, by increasing the thickness of the expanded cell crash cushion 11, the amount of energy which may be absorbed will also be increased. Thus, depending on the traffic in the area or the vehicles which one desires to stop, the thickness of the expanded cell crash cushion 11 and/or number of cells areas 19 per unit of area may be varied to achieve the desired response.

The expanded cell crash cushion 11 is preferably enclosed by a cover 24. The cover 24 may be constructed from any weatherable material that functions to protect the expanded cell crash cushion 11 from environmental degradation and/or vandalism.

As illustrated in FIGS. 5 and 6 in a second preferred embodiment of the invention, the expanded cell crash cushion 111 includes a plurality of sheets 112 and 114. The sheets 112 and 114 are designed so that they may be wrapped over each other in a stacked relationship around the hazard 13.

Each sheet 112 and 114 includes a plurality of intersecting walls 117 and 217 respectively. The intersecting walls 117 and 217 define a plurality of cell areas 119 and 219 respectively. As illustrated in FIG. 6, when the sheets are wrapped around a hazard 13 the cross-sectional diameter 123 of the cell area 119 of the first sheet 112 closest to the hazard 13 is larger than the cross-sectional diameter 125 of the cell area 119 farthest away from the hazard. The cross-sectional diameter 223 of the cell area 219 of the second sheet 114 closest to the first sheet 112 is smaller than the cross-sectional diameter 225 of the cell area 219 farthest away from the first sheet 112.

The intersecting walls 117 and 217 of the expanded cell sheets 112 and 114 are oriented so that they are offset from each other. Therefore, upon impact, not only is there a crushing of the expanded cell crash cushion 111, but also the walls 217 of the second sheet 114 shear into the walls 117 of first sheet 112. Thus, the abutting edges of the intersecting walls 117 and 217 of the sheets 112 and 114 are forced to cut or shear into one another at the point of contact. The shearing action of the intersecting walls 117 and 217 of the sheets 112 and 114 provides a controlled resistance to the energy of an impacting vehicle and thereby dissipates or absorbs at least some of the impact energy.

Moreover, as the intersecting walls 117 and 217 of the sheets 112 and 114 shear into one another, the expanded cell crash cushion 111 is compressed and thereby generates additional resistance force that further dissipates some of the energy of the impacting vehicle. Thus, the impact energy is substantially reduced by the cutting of the intersecting walls 117 and 217 and compression of the sheets 112 and 114.

In a further preferred embodiment, the cell areas 19, 119 and 219 may be filled with a filler material (not shown). The filler material may comprise a deformable energy absorbing foam material such as a deformable foam plastic. The deformable foam material increases the strength and rigidity of the intersecting walls 17, 117 and 217. It has been found that polyurethane provides a deformable foam material with a good response.

The deformable foam material provides lateral support which increases the strength and rigidity of the intersecting walls 17, 117 and 217. Therefore, the intersecting walls 17, 117 and 217 are able to shear into one another more consistently. Additionally, as the foam material is compressed an additional resistance force is generated that further dissipates the impact energy. Moreover, the intersecting walls 17, 117 and 217 will also shear into the foam material causing an additional resistance force which further dissipates the impact energy.

It should be understood that although only two sheets 112 and 114 are illustrated in FIGS. 5 and 6, additional sheets may be arranged in the indicated stacked orientation to provide for increased or decreased energy absorption and staging. Moreover, although polyurethane foam has been suggested as a deformable energy absorbing foam material, it should be appreciated that any such material may be employed in the indicated manner.

Figure 8:
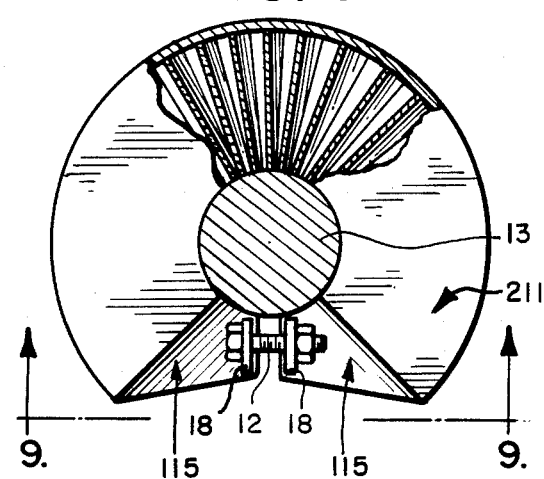
FIG. 8 illustrates a top view of the expanded cell crash cushion of FIG. 7 wrapped around a post, with parts broken away.
Figure 9:
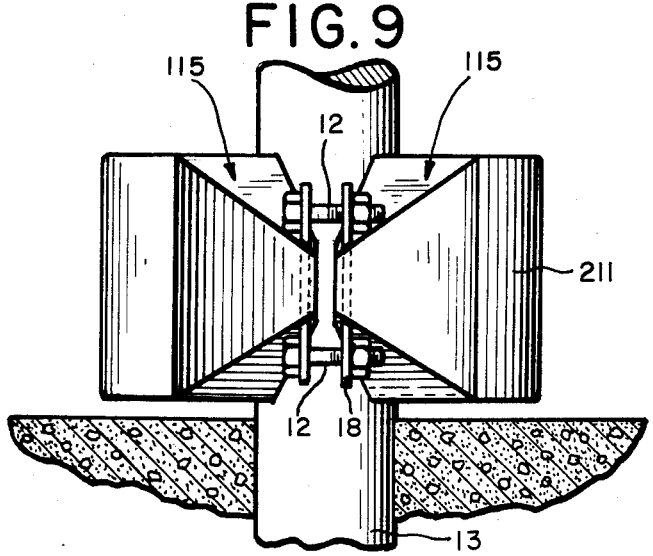
FIG. 9 illustrates a side elevation view the expanded cell crash cushion of FIG. 7 wrapped around a post.

In a preferred embodiment illustrated in FIGS. 7-9, to secure the end members 115 of the expanded cell crash cushion 211 to the hazard 13, brackets 18 may be used. As illustrated in FIG. 7, the brackets 18 are attached to the end members 115 of the crash cushion 211. The expanded cell crash cushion 211 is then wrapped around the hazard 13 and bolts 12 are passed through the brackets 18 to secure the expanded cell crash cushion around the hazard. Preferably, the brackets 18 and bolts 12 are strong enough to hold the expanded cell crash cushion 11 against the hazard 13, but do not present a hazard themselves. Thus, the brackets 18 and bolts 12 are designed to breakaway upon impact. Sheets 112 and 114 may also include brackets 18 which allow the sheets to be secured to the hazard in a manner similar to the expanded cell crash cushion 111. The sheets 112 and 114 may also be secured to each other by pins (not shown).

Figure 10:
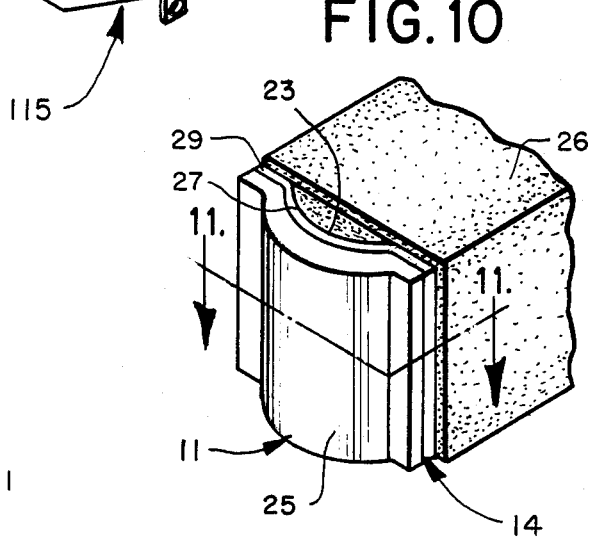
FIG. 10 illustrates a side elevation view of a further preferred embodiment of the expanded cell crash cushion secured to an adaptor.
Figure 11:
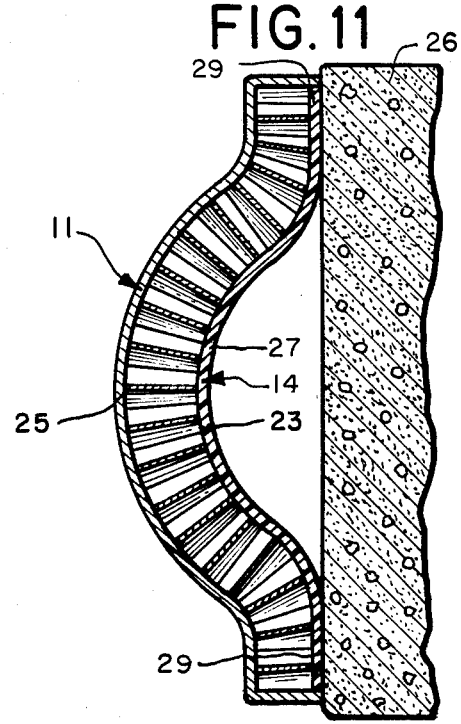
FIG. 11 illustrates a cross-sectional view of the expanded cell crash cushion and adaptor taken along lines 11—11 of FIG. 10.

As illustrated in FIGS. 10 and 11, the expanded cell crash cushion 11 may also be used to absorb and attenuate the impact energy of a vehicle impacting a nonrounded hazard 26. To this end, an adaptor 14 is utilized. The adaptor 14 includes a semi-circular portion 27 and end members 29. The end members 29 of the adaptor 14 are secured to the hazard 13 and the expanded cell crash cushion 11 is secured over the adaptor. As illustrated in FIG. 11, due to the semicircular portion 27 of the adaptor 14, the cross-sectional dimension 23 of the cell area nearest the adaptor 14 is less than the cross-sectional dimension 25 of the cell area farthest away from the adaptor.

The intersecting walls 17, 117 and 217 and thereby the expanded cell crash cushion 11 and 211 may be made of any fairly rigid material, for example, cardboard, plastic, plastic coated paper, resin impregnated linen, paper, glass fiber cloth, aluminum, or other metals or material. It should be noted that the choice of materials may influence the cross-sectional shape of the cell areas 19.

It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the following claims.

We claim:

1. An energy absorbing apparatus comprising:
an energy absorbing sheet including a plurality of expanded cells; and
adaptor means for securing said energy absorbing sheet to a nonrounded object, said adaptor means including a semicircular portion such that when said sheet is secured to said adaptor at least some of said cells define a longitudinal space having a cross-sectional diameter that is smaller nearer said adaptor and larger away from said adaptor.

2. The energy absorbing apparatus of claim 1 wherein said expanded cells have a hexagonal cross-sectional shape.

3. The energy absorbing apparatus of claim 1 including cover means for enclosing said energy absorbing sheet.

4. The energy absorbing apparatus of claim 1 including filler means for filling said longitudinal space and adapted to deform to absorb at least some of the impact energy of an impacting vehicle.

5. The energy absorbing apparatus of claim 4 wherein said filler means is a deformable foam plastic material.

6. An apparatus capable of absorbing at least some of the energy of an impacting vehicle comprising:
at least one energy absorbing sheet having a plurality of intersecting walls for defining a plurality of cells; and
adaptor means for securing said at least one sheet to a nonrounded hazard so that at least some of said cells define a longitudinal space having a cross-sectional diameter that is smaller nearer said adaptor and larger away from said adaptor.

7. The apparatus of claim 6 wherein the impact energy which may be absorbed by said apparatus may be varied by increasing or decreasing the number of cells per unit of cross-sectional area.

8. The apparatus of claim 6 wherein said cells have a hexagonal cross-sectional shape.

9. The apparatus of claim 6 wherein said cells have a circular cross-sectional shape.

10. The apparatus of claim 6 including filler means for filling said longitudinal spaces and adapted to deform to absorb at least some of the energy of an impacting vehicle.

11. The apparatus of claim 10 wherein said filler means is a deformable foam plastic material.

12. The apparatus of claim 11 including cover means for covering said energy absorbing sheet.

13. The apparatus of claim 6 wherein said adaptor means includes a semi-circular portion.

14. An apparatus capable of absorbing the impact energy of a moving vehicle comprising:
a plurality of energy absorbing sheets designed to be wrapped around a hazard in a stacked relationship for compressing and cutting into one another to dissipate at least some of the energy of an impacting vehicle;
each sheet having a plurality of intersecting walls for defining a plurality of cells; and
each of said cells defining a longitudinal space; and
adaptor means for securing said sheets to a nonrounded hazard so that a cross-sectional diameter of said longitudinal spaces closest to said adaptor is smaller than a cross-sectional diameter of said longitudinal spaces farthest away from said adaptor.

15. The apparatus of claim 14 wherein said cells have a hexagonal cross-sectional shape.

16. The apparatus of Claim 14 including:
filler means for filling said longitudinal spaces, said filler means being adapted to deform to absorb at least some of the energy of an impacting vehicle and to support said intersecting walls so that the edges of said walls of abutting energy absorbing sheets cut into one another and into said filler means in response to said impact force to dissipate the energy of the impact.

17. The apparatus of claim 14 wherein the impact energy which may be dissipated may be varied by increasing or decreasing the number of expanded cell areas per unit of cross-sectional area.

18. The apparatus of claim 14 including means for securing said sheets to each other.

19. The apparatus of claim 14 wherein said intersecting walls of each of said sheets are oriented so that they are offset from each other.

20. The apparatus of claim 16 wherein said filler means is a foam plastic material.

21. In combination with a roadside hazard energy absorbing apparatus adapted to protect an impacting vehicle from the roadside hazard, said apparatus comprising:

at least one energy absorbing sheet having an inner surface and an outer surface, said sheet defining a plurality of cells, each defining a respective longitudinal axis extending between the inner and outer surfaces and a respective space centered on the longitudinal axis such that the cells are arranged side by side in the sheet;

means securing the energy absorbing sheet to the roadside hazard around a non-planar contour thereof such that the outer surface of the energy absorbing sheet assumes a position generally perpendicular to a selected plane, the longitudinal axes of at least a majority of the cells are oriented generally parallel to the selected plane and the inner surface is positioned between the outer surface and the roadside hazard;

said energy absorbing sheet positioned around at least a portion of the roadside hazard such that at least a majority of the cells are tapered and define a smaller cross-sectional dimension nearer the roadside hazard and a larger cross-sectional dimension farther from the roadside hazard such that the impacting vehicle encounters increasing resistance as it approaches the hazard.

22. The invention of claim 21 wherein each of the cells is hexagonal in cross-section.

23. The invention of claim 21 further comprising a filler which occupies the spaces of the cells and is adapted to deform to absorb kinetic energy of the impacting vehicle.

24. The invention of claim 23 wherein the filler comprises a foam.

25. The invention of claim 21 wherein the roadside hazard is cylindrical and the energy absorbing sheet is wrapped at least partially around the roadside hazard.

26. The invention of claim 21 wherein the roadside hazard includes a surface, and wherein the securing means forms the sheet in a convex curve having a radius of curvature smaller than that of the surface.

27. The invention of claim 21 wherein the energy absorbing sheet comprises an array of intersecting walls which define the cells.

28. The invention of claim 27 wherein the at least one energy absorbing sheet comprises a plurality of energy absorbing sheets arranged in a stacked relationship for compressing and cutting into one another to dissipate kinetic energy of the impacting vehicle.

29. The invention of claim 28 further comprising a filler which occupies the spaces of the cells and is adapted to deform to absorb kinetic energy of the impacting vehicle.

30. The invention of claim 29 wherein the intersecting walls of the sheets are offset from each other.

31. The invention of claim 21 wherein the outer surface of the energy absorbing sheet is cylindrical in shape.

32. The invention of claim 21 wherein the longitudinal axes extend between the inner and outer surfaces.

* * * * *